FIG. 1
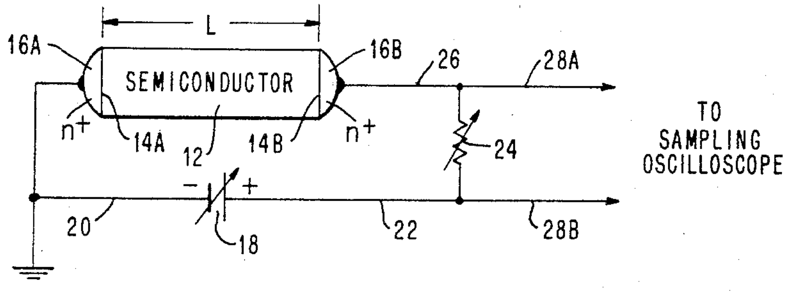
FIG. 2
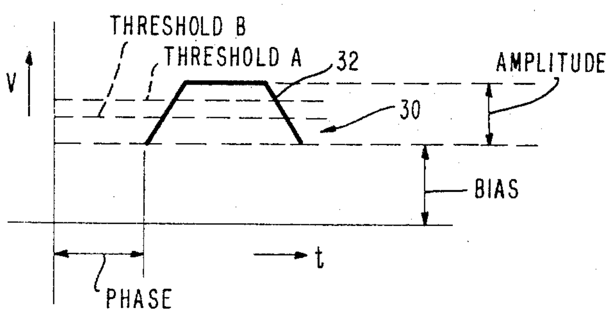
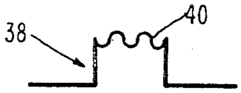
FIG. 3A FIG. 3B
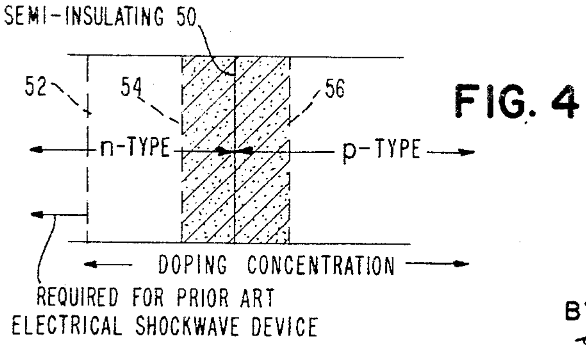
FIG. 4
INVENTOR
ROLF W. LANDAUER
BY Bernard N. Wiener
ATTORNEY United States Patent Office 3,435,307
Patented Mar. 25, 1969

3,435,307

ELECTRICAL SHOCK WAVE DEVICES AND CONTROL THEREOF

Rolf W. Landauer, Briarcliff Manor, N.Y., assignor to International Business Machines Corporation, Armonk, N.Y., a corporation of New York Filed Jan. 17, 1966, Ser. No. 521,192
Int. Cl. H01l 11/04
U.S. Cl. 317—235 10 Claims

ABSTRACT OF THE DISCLOSURE

An electrical shock wave device of the "Gunn-effect" type is described as comprising a semiconductive body, e.g., GaAs, having a density of conduction carriers less than a particular density required to initiate and support electrical shock wave propagation in the presence of an applied electric field of particular intensity. The density of conduction carriers along a surface channel of the semiconductive body is increased, for example, by irradiation with electromagnetic energy or by an electric field effect, in excess of such particular density to initiate electrical shock wave propagation. Electrical shock wave propagation is supported only along the surface channel of the semiconductive body having the increased density of conduction carriers. Also, an electric field effect is employed to deplete conduction carriers from the surface channel of a semiconductive body having a normal density of conduction electrons sufficient to support electrical shock wave propagation in the presence of applied electric fields of a particular intensity.

This invention relates generally to electrical shock wave devices and it relates, more particularly, to control of electrical shock wave propagation therein.

An electrical shock wave device includes a circuit wherein electrical shock wave propagation occurs in a semiconductor region. During activation of an electrical shock wave device, there is a nonuniform field distribution in a semiconductor region which moves in space as time proceeds. It is this movement of a high field region which traverses the semiconductor region from cathode to anode and is reinitiated at the cathode that provides repetitious electrical shock wave propagation. The electrical shock wave propagation is a transient localized space charge distribution that traverses the semiconductor region in the presence of a sufficiently intense electric field at a velocity approximately equal to the drift velocity of the conduction carriers, i.e., approximately $10^7$ cm./sec. In order for the localized space charge distribution to occur in the semiconductor region, it has been required that there be present a sufficient normal density of conduction electrons and an inhomogeneity in the electric field gradient. The normal density, i.e., the equilibrium density, of conduction electrons in a semiconductor region is descriptive of the n-type charge carriers available for current at a particular temperature due to the crystalline structure and dopant concentration of the semiconductor region. There occurs a change in the current in the circuit related to the electrical shock wave propagation in the semiconductor region.

The original electrical shock wave device, now termed the "Gunn-effect" device, is presented in U.S. Patent No. 3,365,583, entitled "Electric Field-Responsive Solid State Devices" issued on Jan. 23, 1968, to J. B. Gunn, and assigned to the assignee hereof. It is a continuation-in-part of U.S. patent application Serial No. 286,700, entitled "Semiconductor Microwave Oscillator" filed June 10, 1963 which is now abandoned. Illustrative background articles which describe prior art electrical shock wave devices are: "Instabilities of Current in III–V Semiconductors" by J. B. Gunn, IBM Journal of Research and Development, April 1964, pages 141 to 159; and "The Gunn Effect" by J. B. Gunn, Journal of International Science and Technology, October 1965, pages 43 to 56. It has been demonstrated in the practice of the prior art that electrical shock wave propagation can be supported in a semiconductor region of either GaAs or InP. These materials are presumed to be exemplary of many semiconductor regions within which electrical shock wave propagation can be established. It has previously been determined that a resistivity less than approximately 100 ohm per centimeter in the semiconductor region is required for there to be present a normal density of conduction electrons sufficient to permit electrical shock wave propagation in the region.

Heretofore, prior art electrical shock wave devices have required a sufficient normal density of conduction electrons to permit electrical shock wave propagation in the semiconductor region. This has required that the doping concentration in the semiconductor region of n-type dopant be critically controlled during the preparation of the semiconductor region. Since the particular resistivity which is required depends upon the particular use of the electrical shock wave device, it is important that practice with such devices not be limited by the normal density of conduction electrons.

Further, in the operation of prior art electrical shock wave devices, a relatively large amplitude voltage which establishes the electric field must be carefully controlled over a relatively small increment level thereof in order that the electrical shock wave propagation be both initiated and sustained. This requires a percentage control of the voltage level greater than is desirable for many circuit applications. Additionally, as establishing a voltage across the semiconductor region of the electrical shock wave device takes time, the response of the prior art electrical shock wave device is limited by the time required for establishing the voltage level.

In the prior art practice with electrical shock wave devices, if the electric field established in the semiconductor region has been sufficient to support electrical shock wave propagation, the propagation has occurred. It is desirable for some operational circumstances that it be possible to suppress the electrical shock wave propagation temporarily even though an appropriate electric field remains established.

It has also been determined in the prior art that amplification of input waveforms may be achieved in an electrical shock wave device if the normal density of conduction band electrons is less than required for electrical shock wave propagation only, and the electric field is less than required for electrical shock wave propagation. Heretofore, control of the amplification has been limited by the control available for the electrical shock wave propagation.

It is an object of this invention to provide an electrical shock wave device and control thereof wherein the density of conduction electrons is altered between two conditions.

It is another object of this invention to provide an electrical shock wave device and control thereof wherein the normal density of conduction electrons is insufficient for electrical shock wave propagation in the presence of a requisite electric field.

It is another object of this invention to provide an electrical shock wave device and control thereof wherein the normal density of conduction electrons is sufficient for electrical shock wave propagation in the presence of a requisite electric field and is reduced in order to suppress the propagation.

It is another object of this invention to provide an electrical shock wave device and control therefor wherein the density of conduction electrons available for electrical shock wave propagation in the semiconductor region is controlled externally.

It is another object of this invention to control the density of conduction electrons in the semiconductor region of an electrical shock wave device by establishing a density of conduction electrons therein greater than normally present from the crystal structure and dopant concentration therein to permit electrical shock wave propagation in the region.

It is another object of this invention to provide an electrical shock wave device for which the occurrence of electrical shock wave propagation is not critically dependent on the time required for achieving a requisite electric field.

It is another object of this invention to provide an electrical shock wave device and control thereof in which control of amplification of input waveforms is achieved through altering the density of conduction electrons from the normal density thereof.

This invention provides electrical shock wave devices and control thereof. In the practice of the invention, the density of conduction electrons in a semiconductor region of the electrical shock wave device is altered in order to change the conductivity of the region between two conditions. In one condition, electrical shock wave propagation can be supported by an applied requisite, or particular, electric field since there is present a sufficient density of conduction electrons.

In the practice of one aspect of the invention, the semiconductor region of an electrical shock wave device does not have a sufficient normal density of conduction electrons to permit electrical shock wave propagation in the presence of the requisite electric field. An incremental density of conduction electrons is temporally introduced in the semiconductor region to permit electrical shock wave propagation. An incremental density of conduction electrons for the necessary localized space charge distribution in an electrical shock wave device is obtained differently in several embodiments of this invention.

In the practice of another aspect of this invention, the semiconductor region of an electrical shock wave device has a sufficient normal density of conduction electrons to permit electrical shock wave propagation in the presence of the requisite applied electric field. An incremental density of conduction electrons is depleted from the region in order to suppress the electrical shock wave propagation capability of the region.

In one embodiment of this invention, electromagnetic energy from an external source is coupled to the semiconductor region of the electrical shock wave device where it transfers bound electrons to a conduction state. In particular, the electromagnetic energy consists of light radiation having photon energy greater than either the band gap in the semiconductor region for transfer of electrons from the valence band to the conduction band or greater than the energy required to transfer electrons from a donor dopant impurity level to the conduction band.

In another embodiment of this invention, a field effect is utilized to change an incremental density of conduction electrons in the semiconductor region of an electrical shock wave device which together with the normal density of conduction electrons normally present in the region is sufficient to permit the localized space charge distribution necessary for electrical shock wave propagation.

In another embodiment of this invention, a field effect is utilized to deplete an incremental density of conduction electrons from the normal density of conduction electrons in a semiconductor region to suppress capability of the region for supporting electrical shock wave propagation.

The foregoing and other objects, features and advantages of the invention will be apparent from the following more particular description of preferred embodiments of the invention as illustrated in the accompanying drawings.

In the drawings:

FIG. 1 is a schematic circuit diagram used for explaining the general nature of the prior art.

FIG. 2 is a line diagram characterizing several pertinent parameters of an input voltage pulse applied across a semiconductor region for establishing a requisite electric field therein.

FIGS. 3A and 3B are line diagrams illustrative of current waveforms prior to and after the onset of electrical shock wave propagation in a semiconductor region.

FIG. 4 is a line diagram characterizing various dopant concentrations in a semiconductor region useful for describing both the practice of the present invention and the practice of the prior art.

Figure 8A:
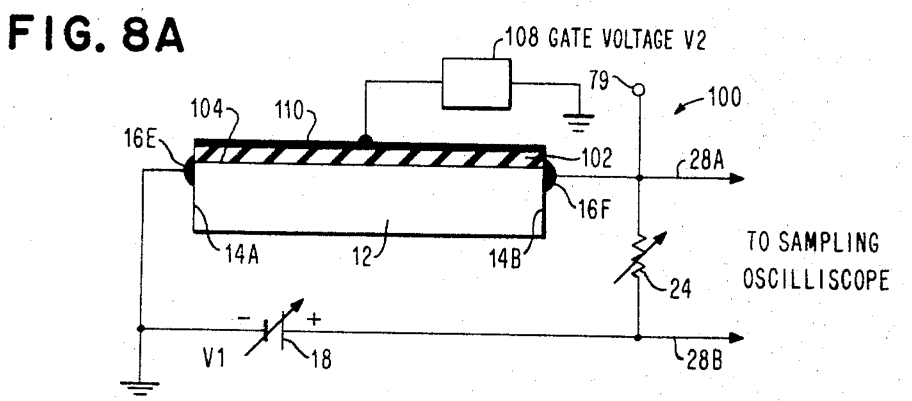

FIG. 8 presents circuit diagrams of features of embodiments of this invention in which:

FIG. 8A shows a field effect electrode on one surface of an active semiconductor region of an electrical shock wave device and ohmic $n^+$ contacts on the current path ends thereof.

Figure 8B:
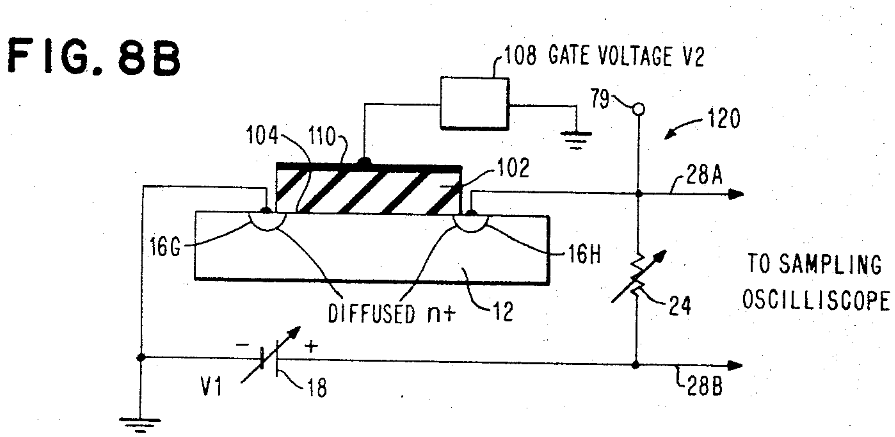

FIG. 8B shows diffused $n^+$ contacts on the same surface of the active semiconductor region as a field effect electrode.

Figure 8C:
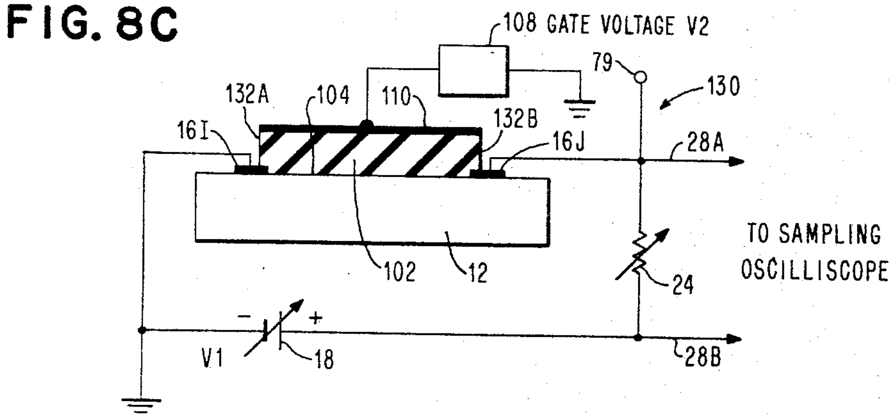

FIG. 8C shows an electrical shock wave device according to this invention having both a field effect electrode and metallic contacts for current path on one surface of the active semiconductor region.

The practice of the invention will now be described with reference to the drawings. The general nature of the prior art will be described with reference to FIGS. 1 to 4.

With reference to FIG. 1, a prior art electrical shock wave device has a semiconductor crystalline region 12, preferably monocrystalline GaAs or InP, having an active length L between faces 14A and 14B. Ohmic $n^+$ contacts 16A and 16B are established on semiconductor faces 14A and 14B, respectively. Electrical connections are made to the ohmic $n^+$ contacts in circuit relationship to variable voltage source 18. Voltage source 18 has its negative terminal connected via conductor 20 to contact 16A and its positive terminal connected via a path consisting of conductor 22, load resistor 24 and conductor 26 to contact 16B. A measure of the current in load resistor 24 is obtained via conductors 28A and 28B connected, respectively, to conductors 26 and 22 for presentation of a replica of the voltage drop therein on the display tube face of a sampling oscilloscope, not shown.

Whereas the prior art practice has required that the doping concentration in semiconductor region 12 be adequate to establish it with sufficient n-type carriers to support electrical shock wave propagation, the practice of this invention provides that semiconductor region 12 may normally have an insufficient concentration of n-type charge carriers to permit electrical shock wave propagation in the presence of the requisite electric field.

As noted above, the prior art semiconductor region 12 may be monocrystalline GaAs or InP with an n-type doping concentration, i.e., normal equilibrium density of conduction electrons, sufficient to permit electrical shock wave propagation therein. An electrical shock wave is a localized space charge distribution in semiconductor region 12 which is initiated contiguous to contact 16A and propagates across the length L of region 12 to contact 16B. It arises concomitantly with a local inhomogeneity in an electric field established between contacts 16A and 16B by voltage source 18 provided the electric field is initially at least of a certain threshold level A shown in FIG. 2.

The electrical shock wave initiated at cathode 16A continues to propagate across the semiconductor region 12 provided that the electric field is maintained at least to the level obtained by the application of a voltage threshold level B. In FIG. 2, an additional bias level is indicated representative of a constant voltage applied across semiconductor region 12 to which the voltage level 32 of pulse 30 is added. Except for power dissipation limitations, the bias voltage may be continuously applied across the semiconductor region 12.

FIGS. 3A and 3B are idealized current waveforms useful for explaining the relationship between current in semiconductor region 12 and the voltage applied between contacts 16A and 16B. Under the assumption that voltage pulse 30 has an upper voltage level 32 less than threshold level A, the current in load 24 as presented on the display tube face of a sampling oscilloscope, not shown, is that of FIG. 3A. It is noted that the current waveform 36 of FIG. 3A is comparable in shape to voltage pulse 30 of FIG. 2. When the upper level 32 of voltage pulse 30 exceeds that of threshold level A, a localized space charge distribution is initiated near contact 16A and propagates toward contact 16B. The concomitant change in current is repeated for each electrical shock wave launched from contact 16A. There is illustrated in FIG. 3B a current oscillation 40 which exists during the time interval that such voltage pulse 30 is applied across semiconductor region 12. The current waveform 38 of FIG. 3B is characterized by an oscillation 40.

The practice of the present invention with respect to the requirements for the doping concentration of semiconductor region 12 will be explained with reference to FIG. 4. In FIG. 4, there is a diagrammatic presentation of the possible doping concentrations for a semiconductor region. The scale of FIG. 4 is relative, i.e, the doping concentrations indicated by vertical lines 52, 54, and 56 are relative to vertical line 50. To the left of vertical line 50, the region 12 (FIG. 1) is n-type, i.e., the doping concentration provides a source of conduction electrons. To the right of vertical line 50, the doping concentration provides p-type semiconductor material, i.e., there is present a sufficient concentration of holes to permit significant current thereby. If holes are present in the semiconductor region 12 due to p-type doping concentration in sufficient numbers and with sufficient mobility, they preclude electrical shock wave propagation since their combined contribution is analogous to a shunt path connected across the semiconductor region. If the shunt path has lower resistivity than the semiconductor region, it will determine the overall resistivity and enforce a uniform field in the semiconductor region.

In the practice of the prior art electrical shock wave devices, the requirement that the semiconductor region 12 be of sufficiently n-type doping concentration for a given applied electric field to support electrical shock wave propagation therein is identified by vertical line 52. It is a premise of this invention that the semiconductor region 12 normally not have present therein a doping concentration adequate to provide n-type carriers as indicated by a doping concentration to the left of vertical line 52. Vertical line 50 indicates that the semiconductor region 12 has a vanishing doping concentration of and is conventionally termed semi-insulating. However, it is within the contemplation of this invention that the semiconductor region 12, for a given applied electric field, have therein a possible n-type doping concentration less than represented by vertical line 52, such as represented by vertical line 54, i.e., between vertical line 50 and 54. Although a sufficient p-type doping concentration would effectively shunt the semiconductor region 12 for electrical shock wave propagation, a small amount of p-type doping concentration will slightly impair the propagation but not seriously modify it. Accordingly, it is within the contemplation of the practice of this invention that the semiconductor region 12 have therein a doping concentration characterized by vertical line 56 and the region between it and vertical line 50.

Functionally, the doping concentrations evidenced in FIG. 4 exemplify the possibility for doping concentrations in the semiconductor region 12 for a given applied electric field. If the region 12 is heavily doped with n-type dopants, there is a large number of electrons available for current flow between contacts 16A and 16B. If there were a large doping concentration of p-type in the region 12, the holes presented thereby would be sufficient to preclude the shock wave propagation.

An embodiment of this invention will now be described with reference to FIGS. 5 to 7. In the embodiment 70 of FIG. 5, the circuit appears similar to the circuit presented in FIG. 1 in that the semiconductor region 12, voltage source 18, load resistor 24, connections 28A and 28B across load resistor 24 for a sampling oscilloscope may be compared. However, the contacts 16C and 16D attached to faces 14A and 14B, respectively, may either be ohmic or ohmic $n^+$, i.e., either a metallic contact or an adjacent semiconductor region having n-type carriers therein. In the operation of the embodiment 70 of FIG. 5, a volume 72 of electrons is established in the semiconductor region 12 contiguous to surface 74 thereof by absorption of energy from electromagnetic radiation indicated by arrows 76 incident from an external source 78. Electromagnetic radiation 76 may be either coherent or noncoherent.

When the radiation source 78 provides the beam 76 of electromagnetic radiation, electrons are activated from their normal energy level to an excited energy level where they may contribute to current flow in semiconductor region 12 between contacts 16C and 16D. When the voltage source 18 has established an electric field in semiconductor region 12 of sufficient intensity that an electrical shock wave could propagate therein were there present a sufficient number of conduction electrons, the development of electron layer 72 in semiconductor region 12 by photon absorption provides the necessary charge carriers for the electrical shock wave propagation and is current conductive between contacts 16C and 16D. Although semiconductor region 12 normally has insufficient n-type carriers to support electrical shock wave propagation, under certain operational circumstances if the n-type dopant concentration and volume in the portion thereof adjacent to layer 72 has proper conductivity, it may act as a shunt path for current flow in region 12 and the electrical shock wave does not propagate in layer 72. The photoconductance induced in region 12 by light 76 must be large compared to its normal conductance in order not to have a shunting condition. For this to occur, the n-type dopant concentration in region 12 is adjusted during crystal growth.

The physics of the transfer of the photon energy to electrons within semiconductor region 12 will be explained with reference to FIGS. 6 and 7 which are useful for characterizing absorption of photon energy by electrons in the valence band and in a donor impurity level, respectively. FIG. 6 illustrates the energy band structure of a semi-insulating semiconductor crystal region 12. Electrons are present in both a valence band 80 and a conduction band 82 having a forbidden band 84 therebetween. In the practice of this invention, the semiconductor region 12 normally has an insufficient number of electrons in the conduction band 82 to support electrical shock wave propagation in semiconductor region 12 when electromagnetic radiation 76 is absorbed within semiconductor region 12. Electrons are transferred from the valence band 80 to the conduction band 82 provided that the photon energy is at least that of the width W of the forbidden band 84. Intermediate the top and bottom edges of the valence band and conduction bands, respectively, there is indicated a Fermi level 86. The Fermi level is a particular value of energy whose relative position to the valence band 80 and to the conduction band 84 is indicative of the densities of holes and electrons therein, respectively.

Holes are created in the valence band 80 when absorption of photon energy transfers electrons therefrom to the conduction band 82. They are present in semiconductor region 12 in equal numbers to the created conduction electrons but they have appreciably lower mobility and give rise to less current. Therefore, the created holes do not impair the current between contacts 16C and 16D due to the extra conduction electrons resultant from the absorption of light.

Figure 7:
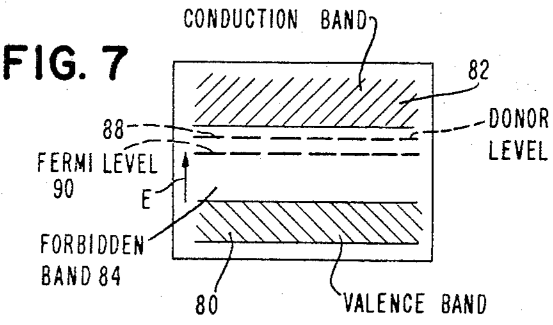
FIG. 7 is a band structure diagram illustrating the presence of an impurity donor level within the forbidden band.

FIG. 7 illustrates the band structure of semiconductor region 12 when there is an additional doping thereof by donor impurity atoms which give rise to an intermediate donor impurity level 88. The Fermi level 90 is close to the impurity level 88.

Background books which provide relevant material concerning the development of conduction electrons by photon absorption in a semiconductor region are:

(a) Photoconductivity of Solids by Richard H. Bube, John Wiley and Sons, Inc. (1960).

(b) Photoelectric Effects in Semiconductors by S. M. Ryvkin, Consultants Bureau, New York (1964).

Since the donor level 88 is closer to the conduction band 82 than valence band 80, less energy is required to transfer electrons therefrom to the conduction band than from valence band 80. Accordingly, the wavelength of electromagnetic radiation 76 may be longer than that required for establishing electron layer 72 by transfer of electrons from valence band 80.

The practice of other embodiments of this invention utilizing an insulated gate field effect will now be described with reference to FIGS. 8A, 8B and 8C which present schematic circuit diagrams using different structure for obtaining a field effect.

Background article describing exemplary prior uses of a field effect are presented in "The TFT—A New Thin-Film Transistor," by P. K. Weimer, Proceedings of the IRE, pages 1462 to 1469 for June 1962; and in "Carrier Surface Scattering in Silicon Inversion Layers," by F. Fang et al., IBM Journal of Research and Development, pages 410 to 415 for September 1964. Copending patent applications Ser. No. 333,443, entitled "Thin Film Transistor and Method of Fabrication," by R. R. Haering et al., filed Dec. 26, 1963, and Ser. No. 491,201, entitled "Insulated-Gate Field Effect Transistor," by L. Esaki et al., filed Sept. 29, 1965, and assigned to the assignee hereof, present technology using a field effect.

In the practice of this invention using a field effect, a channel or layer of conduction electrons is established in semiconductor region 12 between the current conductive contacts 16. By use of a relatively high electric field applied via an insulating layer 102 to a surface of the region 12, conduction electrons are established in the channel. The gate voltage source 108 is temporally set at a sufficiently high relative positive potential that the incremental density of conduction electrons in the channel is sufficient to permit electrical shock wave propagation therein. The consequent current change in the circuit is an oscillation during the application of the voltage 108.

In some circumstances for practice of this invention using the field effect, p-type semiconductor region 12 may be used. It is required that the holes due to the p-type material be immobilized and that there not be a source and drain for hole current. The gate voltage 108 must be greater than either the source or drain voltage. Otherwise, the field direction adjacent the surface of the semiconductor region 12 will be reversed partially, and the desired carrier density along the whole length between the contacts will not be achieved. Insulating layer 102 may have a selected thickness. However, the voltage required to obtain the field effect will be greater for a thicker layer.

Figure 5:
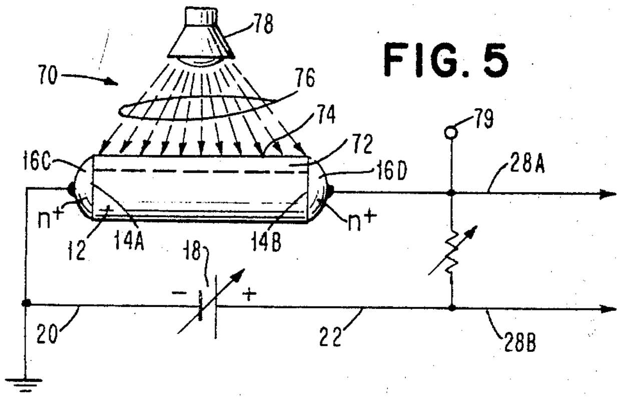
FIG. 5 is a schematic circuit diagram illustrating an embodiment of this invention in which electromagnetic radiation is coupled to the active semiconductor region of an electrical shock wave device.
Figure 6:
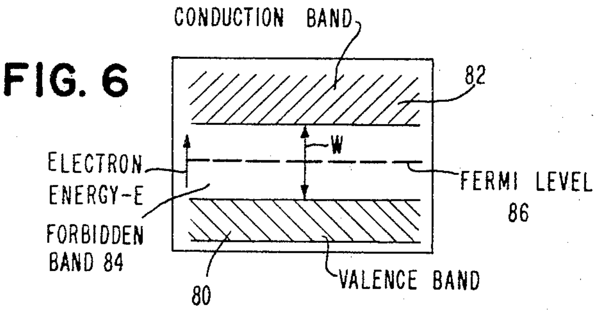
FIG. 6 is a band structure diagram which illustrates the energy difference between the valence band and the conduction band of a semiconductor region.

In greater detail in FIG. 8A, the circuit configuration including semiconductor region 12, voltage source 18, and load resistor 24, may be identical to these portions shown in FIG. 5. In embodiment 100 of FIG. 8A, insulating layer 102 is placed adjacent surface 104 of semiconductor region 12 spanning the entire length between contacts 16E and 16F which are established on faces 14A and 14B, respectively. Contacts 16E and 16F may be either ohmic or ohmic $n^+$. Electrode 110 adjacent the upper surface 104 of insulating layer 102 is connected to gate voltage source 108. Gate voltage source 108 establishes electrode 110 at a higher positive potential $V_2$ than the positive potential of contact 16F established by the voltage $V_1$ of voltage source 18. When the voltage $V_2$ of gate source 108 is sufficiently positive, a field effect establishes a thin layer of conduction electrons in semiconductor region 12 contiguous to surface 104. The insulating layer 102 is made as thin as practical considerations permit so that the gate voltage 108 required to provide the necessary electric field for the field effect is relatively small. However, the thickness of insulating layer 102 is conveniently adjusted for the particular operational circumstances of the use of embodiment 100.

FIG. 8B is another structure for this invention showing the location of diffused $n^+$ contacts on semiconductor region 12. Contacts 16G and 16H are established by a diffusion process in upper surface 104 of semiconductor region 12 adjacent to the longitudinal edges of insulating layer 102. The embodiment 120 of FIG. 8B has the remainder of its circuit comparable to those of embodiment 100 of FIG. 8A.

In embodiment 130 of FIG. 8C, ohmic contacts 16I and 16J are established on surface 104 of semiconductor region 12. They are proximate to the longitudinal edges 132A and 132B of insulating layer 102.

The practice of this invention has been exemplified hereinabove through description of embodiments wherein conduction electrons have been established in the semiconductor region of an electrical shock wave device by coupling light radiation to the region to transfer electrons from a bound level to a conduction level, and by influencing electrons into the semiconductor region by a field effect. It is within the compass of the practice of this invention that these techniques be used in concert. Illustratively, if the insulating layer 102 and the electrode 110 of embodiment 100 of FIG. 8A are light transmissive, an additional charge density may be established in the region 12 by practice analogous to that of the embodiment hereof described with reference to FIGS. 5 to 7.

The structures exhibited in FIGS. 8A, 8B, and 8C for the introduction of conduction band electrons in excess of the normal equilibrium number in semiconductor region 12 can also be used to reduce the number of conduction band electrons by reversing the sign of the field across the insulation region. Thus, if region 12 has a density of electrons adequate to support electrical shock wave propagation, a sufficient negative potential applied to electrode 110 will prevent shock wave formation. To keep the potential within practical bounds, the semiconducting body 12 must be a thin layer such as conventionally is prepared by evaporation or epitaxial deposition.

Although the presentation herein has been addressed mainly to electrical shock wave devices and control thereof for supporting or suppressing electrical shock wave propagation in a semiconductor region, it will be understood that the practice of this invention is applicable to supporting amplification in an electrical shock wave device of input waveforms applied thereto on terminal 79 of FIGS. 5, 8A, 8B, and 8C. The normal density of conduction band electrons is less than required for electrical shock wave propagation only. The density of conduction electrons is increased by the practice of this invention to a level sufficient to support amplification of input waveforms in the presence of the requisite electric field which is less than the electric field requisite for supporting electrical shock wave propagation. An illustrative background article describing amplification of input waveforms in an electrical shock wave device having a semiconductor region with a normal density of conduction electrons is in "Microwave Amplification in a DC-Biased Bulk Semiconductor" by H. W. Thim et al., Applied Physics Letters, Sept. 15, 1965, pages 167 and 168.

While the invention has been particularly shown and described with reference to preferred embodiments thereof, it will be understood by those skilled in the art that various changes in form and details may be made therein without departing from the spirit and scope of the invention.

What is claimed is:

1. An electrical shock wave device for providing a current waveform comprising a semiconductor body having the innate property that an electric field of a particular intensity initiates and supports electrical shock wave propagation at a velocity approximately equal to the drift velocity of conduction carriers when a particular density of conduction carriers is present in said body, said body having a normal density of conduction carriers insufficient to permit said electrical shock wave propagation therein, means including contact means to said body for applying an electric field in said body at least of said particular intensity to support electrical shock wave propagation therein, load means connected to said body, and means active along the length of said body between said contact means for increasing temporally the desnity of conduction carriers in excess of said particular density in a surface of said body extending between said contact means to permit electrical shock wave propagation along said surface of said body while an electric field at least of said particular intensity is applied in said body.

2. An electrical shock wave device according to claim 1 wherein said body is formed of a material selected from the group consisting of GaAs and InP.

3. An electrical shock wave device according to claim 1 wherein the resistivity of said body is less than 100Ω/cm.

4. An electrical shock wave device according to claim 1 wherein said means for increasing the density of conduction carriers includes light radiation source means adjacent a surface of said region.

5. An electrical shock wave device according to claim 1 wherein said means for increasing the density of conduction carriers includes electrode means over a surface of said region in insulated relationship, and means for biasing said electrode means.

6. An electrical shock wave device for providing a current waveform comprising a semiconductor body having the innate property that an electric field of a particular intensity initiates and supports electrical shock wave propagation at a velocity approximately equal to the drift velocity of conduction carriers when a particular density of conduction carriers is present in said body, said body having a normal density of conduction electrons sufficient to permit electrical shock wave propagation therein, load means connected to said body, means including contact means to said body for applying an electric field in said body at least of said particular intensity to support electrical shock wave propagation therein, and means active along the length of said body between said contact means for decreasing temporally the density of conduction carriers below said particular density in a surface of said body extending between said contact means to preclude electrical shock wave propagation in said body while an electric field at least of said particular intensity is applied in said body.

7. An electrical shock wave device according to claim 6 wherein said means for decreasing temporally the density of conduction carriers includes electrode means over a surface of said region in insulated relationship, and means for biasing said electrode means.

8. An electrical shock wave device for providing a current waveform comprising a semiconductor body having the innate property that an electric field of a particular intensity initiates and supports electrical shock wave propagation at a velocity approximately equal to the drift velocity of conduction carriers when a particular density of conduction carriers is present in said body, said body having a normal density of conduction carriers less than said particular density and insufficient to permit said electrical shock wave propagation while an electric field of said particular intensity is applied therein, means including contact means to said body for applying an electric field in said body of less than said particular intensity to support electrical shock wave propagation therein, means active along the length of said body between said contact means for increasing temporally the density of conduction carriers above said particular density in a surface of said body extending between said contact means, means for increasing said electric field in said body in excess of said particular intensity to permit electrical shock wave propagation in said surface while the density of conduction carriers in said surface is above said particular density, and load means connected to and responsive to current along said body.

9. An electrical shock wave device according to claim 8 wherein said means for increasing temporally the density of conduction carriers in said region includes electrode means over the surface of said region in insulated relationship thereto, and means for biasing said electrode means.

10. An electrical shock wave device according to claim 8 wherein said means for increasing temporally the density of conduction carriers in said region includes light radiation source means adjacent a surface of said region.

References Cited

UNITED STATES PATENTS

| | | | |
|---|---|---|---|
| 2,900,531 | 8/1959 | Wallmark | 317—235 |
| 3,271,591 | 9/1966 | Ovshinsky | 317—234 |
| 3,365,583 | 1/1968 | Gunn | 317—234 |

OTHER REFERENCES

RCA Technical Notes, Semiconductor Oscillator, Larrabee et al., RCA TN No. 446, January 1961, sheets 1–3.

JOHN W. HUCKERT, *Primary Examiner.*

JERRY D. CRAIG, *Assistant Examiner.*

U.S. Cl. X.R.

307—299; 331—107